C. L. POND.
Brush.
No. 221,936. Patented Nov. 25, 1879.
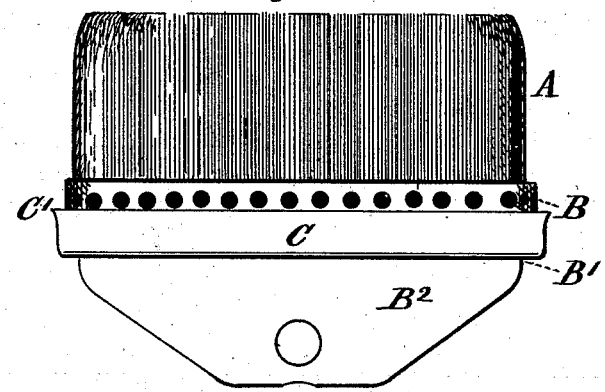
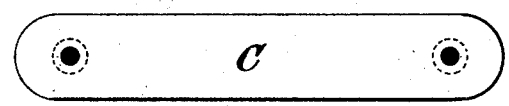
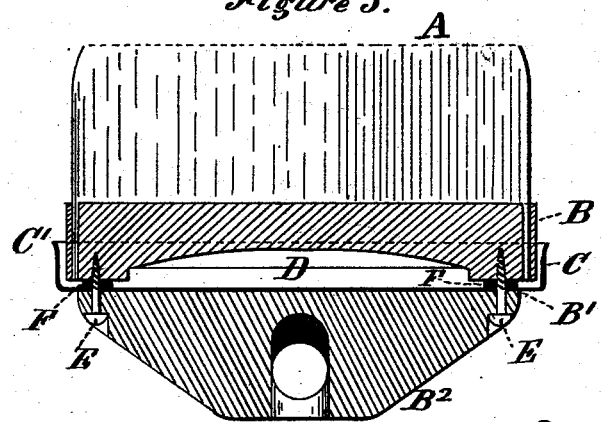
Witnesses,
Wm S Grosvenor
H Sangster
Inventor,
Charles L. Pond
Per James Sangster
Atty.

UNITED STATES PATENT OFFICE

CHARLES L. POND, OF BUFFALO, NEW YORK.

IMPROVEMENT IN BRUSHES.

Specification forming part of Letters Patent No. 221,936, dated November 25, 1879; application filed April 24, 1877.

*To all whom it may concern:*

Be it known that I, CHARLES L. POND, of the city of Buffalo, in the county of Erie and State of New York, have invented certain new and useful Improvements in Brushes, which improvements are fully set forth in the following specification and accompanying drawings, in which—

Figure 1 is a side elevation of a brush complete. Fig. 2 represents a bottom view of the pan or box for catching the drippings of paint or whitewash; and Fig. 3 shows a vertical longitudinal section through a whitewash-brush having my invention connected thereto.

The object of my invention is to provide the means for catching the drippings from a whitewash or other brush, and thereby avoid soiling a floor or carpet while using it; and it consists in combining, with the brush, a pan or receptacle to catch the drippings, connected thereto between the brush and the handle, so that an open space is left between them for the purpose of increasing the space for the drippings without increasing the size of the pan or receptacle, or causing it to project far enough around the outside of the brush to be in the way, as will more clearly hereinafter appear. The arrangement is such that the drippings run out into the pail or other paint-receptacle every time the brush is dipped therein for a fresh supply.

In said drawings, A represents the brush; B, the part to which it is attached. The part B is divided at B', so that the pan C can be placed between them to catch the drippings. The upper edge, C', of the pan is made to flare out a little, as shown, and is arranged so as to project out as little from the brush as possible, and still leave room enough for the drippings to enter. The part B, above the bottom of the pan C, is cut out at D, so as to leave more room for the drippings, as shown in Fig. 3. The lower part, $B^2$, of B is fastened to B by means of the screws E, which also hold the pan C firmly in place.

The letters F represent rubber or leather washers for forming a tight joint between the bottom of the pan C and the bottom of the part B.

I am aware that a drip-pan has been used in combination with a brush. I therefore do not claim such, broadly; but What I do claim as my invention is—

A brush having the body formed in two parts, B $B^2$, in combination with a pan, C, arranged between them, the whole being fastened together, substantially as and for the purposes specified.

CHARLES L. POND.

Witnesses:
JAMES SANGSTER,
WM. S. GROSVENOR.